DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED NOVEMBER 5, 1974

928 O.G. 6

T928,001
PROCESS FOR IMPARTING FLAME RETARDANCE TO POLYESTER FIBERS

Samuel E. Blackwell, 3624 Montclair Road, Kingsport, Tenn. 37664

Filed Feb. 9, 1973, Ser. No. 330,936
Int. Cl. D06p *5/00*
U.S. Cl. 8—17
No Drawing. 6 Pages Specification

Disclosed is a process for producing a dyed, flame retardant fabric by first contacting the fabric with a composition comprising a halogen substituted aliphatic hydrocarbon, a dye and an organic bromine-containing flame retarder, and then contacting the fabric with a superheated vapor of a halogen substituted aliphatic hydrocarbon.